United States Patent [19]

Saijo et al.

[11] Patent Number: 4,689,725
[45] Date of Patent: Aug. 25, 1987

[54] AIMING DEVICE FOR AUTOMOBILE HEAD LAMP

[75] Inventors: Akira Saijo; Fusakiyo Matsune; Yuji Fujino; Shinji Watanabe, all of Shizuoka, Japan

[73] Assignee: Koito Manufacturing Co., Ltd., Tokyo, Japan

[21] Appl. No.: 792,356

[22] Filed: Oct. 29, 1985

[30] Foreign Application Priority Data

| Oct. 31, 1984 | [JP] | Japan | 59-164738[U] |
| Dec. 27, 1984 | [JP] | Japan | 59-199882[U] |
| Dec. 27, 1984 | [JP] | Japan | 59-199883[U] |
| Dec. 27, 1984 | [JP] | Japan | 59-199884[U] |
| Apr. 25, 1985 | [JP] | Japan | 60-62821[U] |
| Aug. 19, 1985 | [JP] | Japan | 60-127112[U] |

[51] Int. Cl.$^4$ ............................................. F21V 3/18
[52] U.S. Cl. .................................... 362/66; 362/289; 362/428
[58] Field of Search ...................... 362/66, 69, 70, 80, 362/269, 273, 285, 289, 427, 428, 61

[56] References Cited

U.S. PATENT DOCUMENTS 4,524,407  6/1985  Igura ........................................ 362/66

FOREIGN PATENT DOCUMENTS 58-63532  4/1983  Japan ....................................... 362/66

Primary Examiner—Charles J. Myhre
Assistant Examiner—D. M. Cox
Attorney, Agent, or Firm—Popper, Bobis & Jackson

[57] ABSTRACT

The present invention relates to an aiming device for adjusting the optical axis of an automobile head lamp, characterized in that it comprises a hollow bearing attached to a movable member which is a lamp unit or a reflection mirror to be moved for adjusting the optical axis, a gear case housing a worm gear and a spur gear engaged with each other, the gear case being attached to a fixed member which is an autobody or a housing for supporting said movable member, an aiming screw whose head is fitted into said hollow bearing and whose screw portion is screwed into a female threaded hole formed in the shaft center of said spur gear, and a device for inhibiting said aiming screw from rotating circumferentially.

10 Claims, 17 Drawing Figures

AIMING DEVICE FOR AUTOMOBILE HEAD LAMP

FIELD OF THE INVENTION AND RELATED ART STATEMENT

This invention relates to an aiming device for adjusting the optical axis of an automobile head lamp, and more particularly to an aiming device in which a worm gear for input rotation and a spur gear for output rotation are used and an aiming screw is screwed into the shaft center of the spur gear for adjusting the optical axis.

There are two types of methods of adjusting the optical axis of an autombile head lamp, namely a reflection mirror moving type in which a reflection mirror is moved with respect to the housing and a lamp unit moving type in which a lamp unit is moved with respect to the autobody. These types are different only in the objects to be moved, but both the same in their principles. In the present specification, members to be moved such as a reflection mirror and a lamp unit are called movable members, while members for supporting these movable members such as a housing and an autobody are called fixed members.

Figure 16:
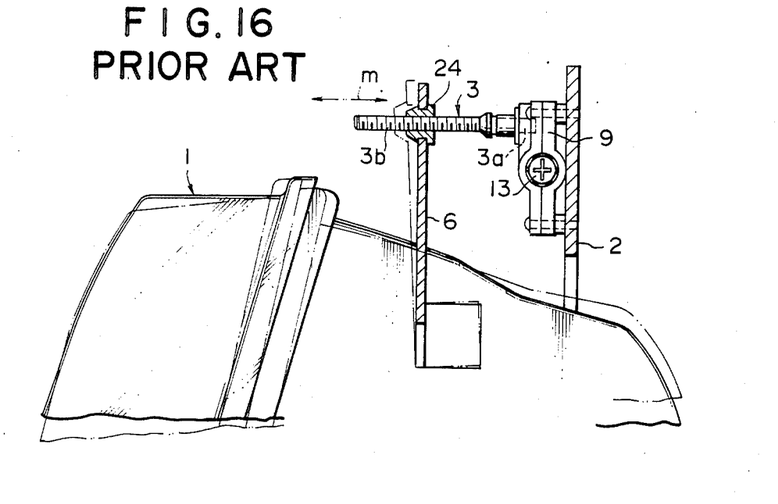
FIG. 16 is a front view with a part broken away.
Figure 17:
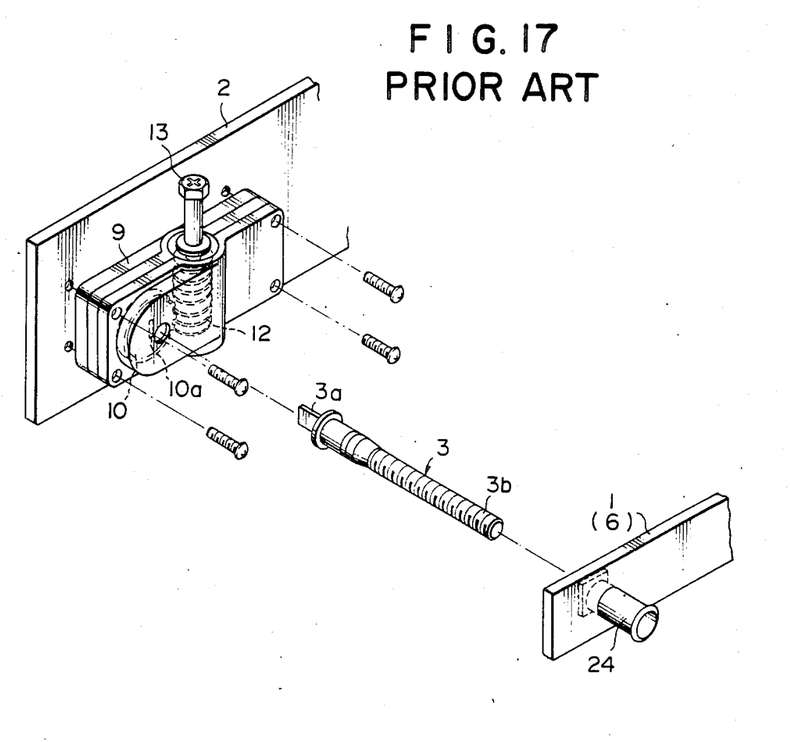
FIG. 17 is an exploded perspective view.

One aiming device of this conventional type is disclosed in Japan Utility Model Application No. 56-13303. This conventional aiming device, as shown in FIGS. 16 and 17, is constructed such that a gear case 9 housing a worm gear 12 for input rotation and a spur gear 10 for output rotation engaged with each other is attached to a fixed member 2, and the head 3a of an aiming screw 3 is engaged connectively with the shaft center 10a of the spur gear 10 accomodated in the gear case 9, while the screw portion 3b of the aiming screw 3 is screwed into a self-locking nut 24 attached to a support member (an adjust metal) 6 on a movable member 1. Consequently, when the worm gear 12 is rotated with an operational grip 13 projected integrally from the worm gear in the gear case 9 and the aiming screw 3 is rotated by the rotation of the spur gear 10 to move the movable member 1 in the longitudinal direction (as indicated by an arrow (m)) through the self-locking nut 24 so as to adjust the optical axis, the front end of the aiming screw can be projected excessively forward from the movable member. Such a device, therefore, is difficult to be applied, especially to a head lamp of the lamp unit moving type.

OBJECTS AND SUMMARY OF THE INVENTION

One object of the present invention is to provide an aiming device in which an aiming screw is not projected toward a movable member during the adjustment of the optical axis and which is easily applicable to a head lamp of the lamp unit moving type.

Another object of the present invention is to provide an aiming device which enables an aiming screw to move universally along with the adjustment of the optical axis while eliminating the need of a self-locking nut which has been required indispensably in the prior art, and which can adjust the optical axis smoothly.

The aiming device for an automobile head lamp according to the present invention, for attaining the objects as mentioned above, is characterized in that a movable member is provided with a hollow bearing into which the head of an aiming screw is fitted, the screw portion of the aiming screw being screwed into the shaft center of a spur gear in a gear case attached to a fixed member, and that the aiming screw is inhibited from rotating circumferentially by suitable means.

The foregoing objects and advantages of the present invention will become apparent from the detailed description to follow the reference to the accompanying drawings. The drawings, however, are exclusively for the purpose of illustration and not for restricting the scope of the invention in any way.

BRIEF DESCRIPTION OF THE DRAWINGS

FIGS. 1 to 5 show a first embodiment of an aiming device in accordance with the present invention.

FIGS. 6 and 7 show a second embodiment of an aiming device in accordance with the present invention.

FIGS. 8 to 11 show a third embodiment of an aiming device in accordance with the present invention.

FIGS. 12 and 13 show a fourth embodiment of an aiming device in accordance with the present invention.

FIGS. 14 and 15 show a fifth embodiment of an aiming device in accordance with the present invention.

FIGS. 16 ad 17 show a conventional aiming device.

DETAILED DESCRIPTION OF PREFERRED EMBODIMENTS

An aiming device for automobile head lamps according to the present invention primarily comprises a hollow bearing attached to a movable member which is a lamp unit or a reflection mirror moved for adjusting the optical axis, a gear case attached to a fixed member which is an autobody or a housing for supporting said movable member, the gear case housing a worm gear and a spur gear engaged with each other, an aiming screw whose head is fitted into said hollow bearing and whose screw portion is screwed connectively into a female threaded hole formed in the shaft center of said spur gear, and means for inhibiting the aiming screw from rotating circumferentially. The first to fifth embodiments, as illustrated in FIGS. 1 to 15 for facilitating comprehension of the present invention, are different from each other only in the means for inhibiting the aiming screw from rotating circumferentially, but other basic constitutions are similar to each other. Accordingly, in the following description and the drawings, corresponding members are designated by the same reference characters.

Now, each embodiment according to the present invention is specifically described with reference to the drawings.

FIGS. 1 to 5 show a first embodiment of the present invention. The reference number 1 designates a lamp unit as a movable member moved for adjusting the optical axis, and the number 2 designates a fixed member which may be an autobody or a bracket thereof for supporting this lamp unit. The lamp unit 1, similarly to conventional ones, has a light source bulb and a lens in a housing so as to serve as a head lamp by itself, and is supported by the fixed member 2 which is an autobody or a bracket thereof by means of one fulcrum member and two aiming screws 3 so as to adjust the optical axis. This movable member 1 is provided with a support member 5 to which a hollow bearing 4 for supporting connectively the head 3a of the aiming screws 3 is attached. The support member 5 is formed integrally with the housing of the lamp unit when the housing is formed of resin material, while when the housing of the lamp unit is formed of a metallic material, an adjust metal 6 secured to the housing is utilized as seen in the second to fifth embodiments in FIGS. 6 to 15. Either a support member 5 or an adjust metal 6 may be used arbitrarily for attaching the hollow bearing 4 to the movable member, likewise in the following second to fifth embodiments. The support member 5 is provided with a fitting hole 5a fitted to the external shape of the hollow bearing 4, so that the bearing 4 is fitted into the subject hole non-rotatably.

Figure 1:
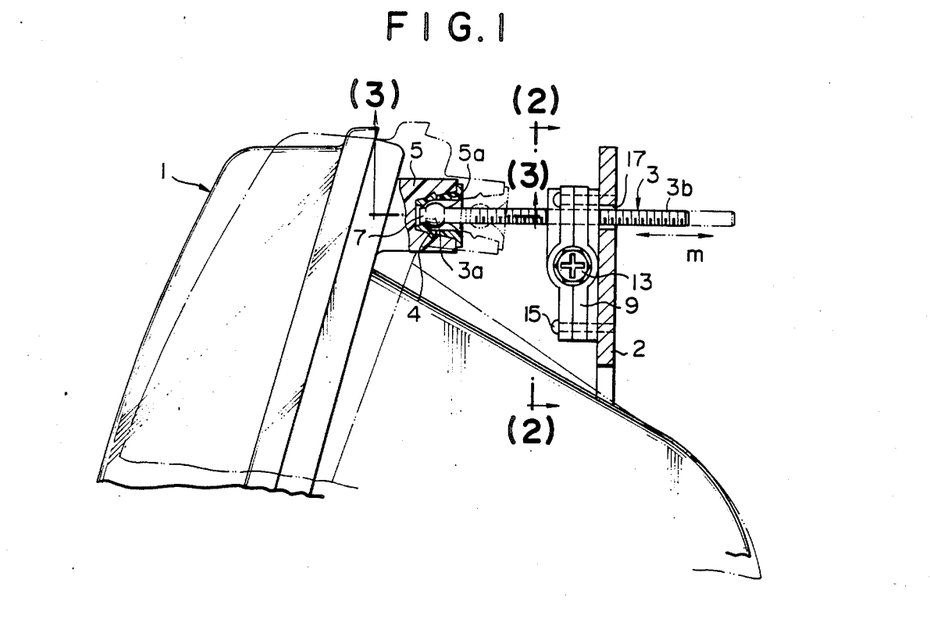
FIG. 1 is a front view, with a part broken away.
Figure 2:
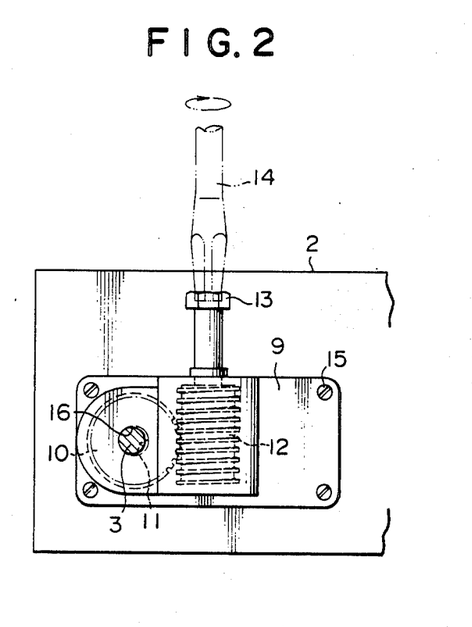
FIG. 2 is a sectional view taken along the line (2)—(2) in FIG. 1.
Figure 3:
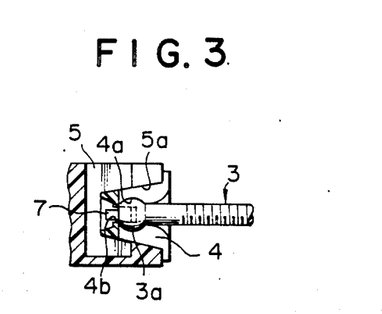
FIG. 3 is a sectional view taken along the line (3)—(3) in FIG. 1.
Figure 4:
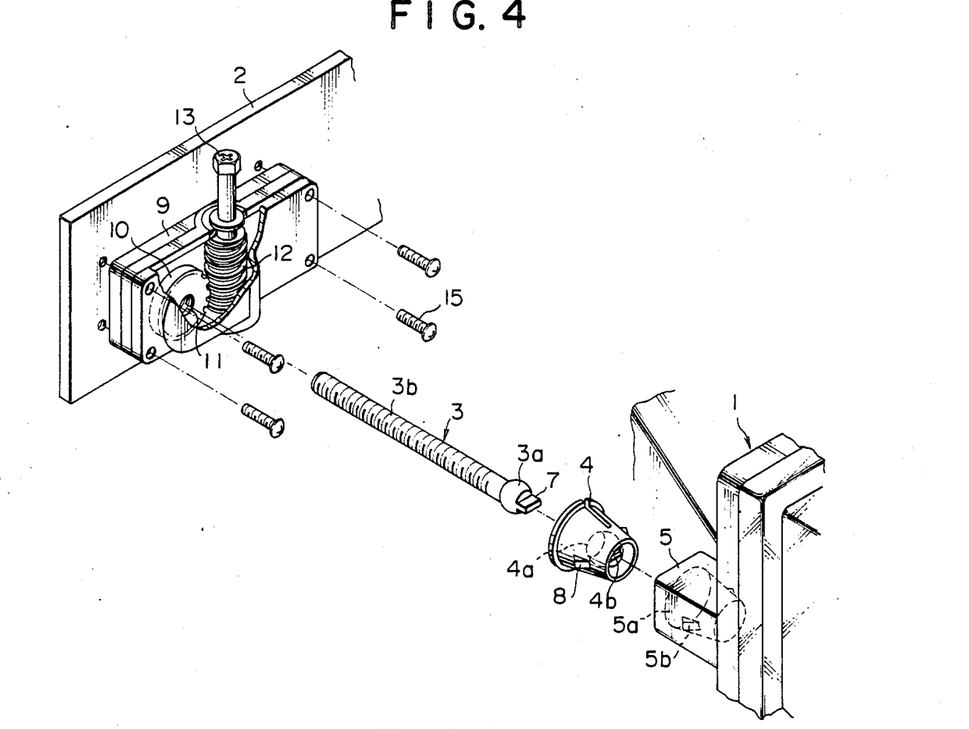
FIG. 4 is an exploded perspective view, with a part broken away.
Figure 5:
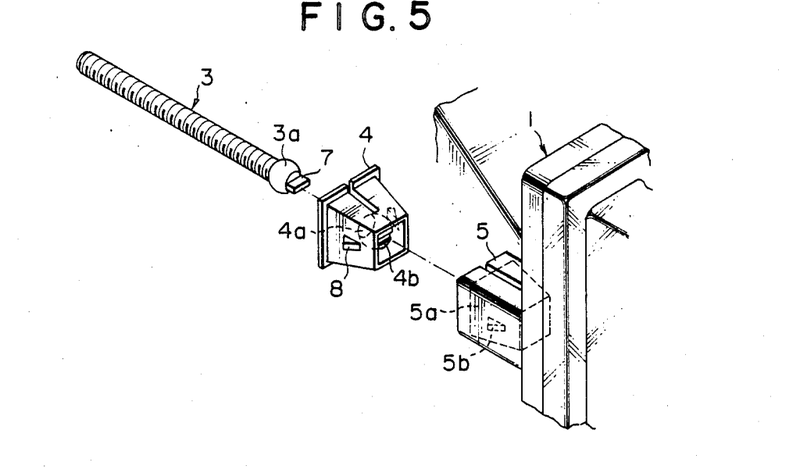
FIG. 5 is an exploded perspective view showing the embodiment having a square-shaped hollow bearing.

The hollow bearing 4 has a spherical face receiving seat 4a for engaging and holding the head 3a of the aiming screw 3, and a square-shaped engaging hole 4b into which an engaging portion 7 projected from the aiming screw head 3a is inserted, so that the hollow bearing 4 is non-rotatably fitted into the support member 5 of the movable member 1. More specifically, the hollow bearing 4 is non-rotatably fitted into the fitting hole 5a of the support member 5 by providing, on the external surface of the hollow bearing 4 formed into a frustum of a cone, an engaging projection 8 to be engaged with an engaging recess 5b formed in the fitting hole 5a in the support member 5 of the movable member 1 as shown in FIG. 4, or alternatively, the bearing 4 is fitted non-rotatably into the fitting hole 5a in the support member 5 by forming the external shape of the hollow bearing 4 into a frustum of a pyramid as shown in FIG. 5.

The aiming screw 3 consists of a head 3a to be connectively fitted into the hollow bearing 4 and a screw portion 3b to be screwed into the female threaded hole 11 in the spur gear 10 housed in the gear case 9. The head 3a of the aiming screw 3 is formed into an approximately spherical shape, while it is provided on its top with a planar engaging portion 7 projected integrally therefrom. The head 3a is fitted into and held by the spherical face receiving seat 4a of the hollow bearing 4, while the engaging portion 7 is inserted into and engaged with a square shaped engaging hole 4b in the bearing 4, such that the aiming screw 3 is connected non-rotatably to the movable member 1. More specifically, when the head 3a of the aiming screw 3 is pressed and fitted into the spherical face receiving seat 4a in the hollow bearing 4, the head 3a is slidably held by the spherical face receiving seat 4a, and the engaging portion 7 projected from the head 3a is engaged with the square-shaped engaging hole 4b in the hollow bearing 4, and the aiming screw 3 is non-rotatably connected to the bearing 4. It is preferred, in view of possible deflective movement during the adjusting operation of the optical axis, to provide some gap between the engaging portion 7 projected from the head 3a of the aiming screw 3 and the engaging hole 4a of the hollow bearing 4. In such a manner, the aiming screw 3 is duly connected to the movable member 1 so as not to rotate circumferentially. The screw portion 3b of the aiming screw 3 is screwed into the female threaded hole 11 formed in the shaft center of the spur gear 10 in the gear case 9. The screw portion 3b may be formed in an ordinary single-start thread or, alternatively, in a multi-start thread having two to four lines. When the screw portion 3b is formed in a multi-start thread, the action of the aiming screw 3 with respect to the rotation of the spur gear 10 is increased so that it is enabled to improve the workability of the adjusting operation of the optical axis.

The worm gear 12 for input rotation and the spur gear 10 for output rotation engaged with each other are housed in the gear case 9, and the gear case 9 is fixed with screws 15 to the fixed member 2 which is an autobody or a bracket thereof. The worm gear 12 in the gear case 9 is provided with an operational grip 13 integrally projected therefrom for applying input rotation to the gear 12. The operational grip 13 is further projected outside the gear case 9 such that it can be operated with a driver 14 or the like. The spur gear 10 engaged with the worm gear 10 is provided with a female threaded hole 11 perforated through its shaft center to be engaged with the screw portion 3a of the aiming screw 3. The gear case 9 is provided with an inserting hole 16 through which the screw portion 3b of the aiming screw 3 is to be passed, the hole 16 being opened in the position to be faced to the female threaded hole 11 of the spur gear 10, while the fixed member 2 is also provided with a through hole 17 through which the screw portion 3b of the aiming screw 3 is passed.

For adjusting the optical axis of the head lamp, the operational grip 13 is rotated with a driver 14 or the like to rotate the worm gear 12 integrally with the grip, and the spur gear 10 is also rotated by the rotation of the worm gear 12. The aiming screw 3 engaged unrotatably with the female threaded hole 11 of the spur gear 10 is thereby moved forward or backward in the longitudinal direction (indicated by an arrow (m)) with respect to the fixed member, whereby the movable member 1 is moved in the longitudinal direction through the hollow bearing 4 connected to the head 3a of the aiming screw 3 and through the support member 5, whereby the optical axis of the head lamp is adjusted.

According to the first embodiment of an aiming device for automobile head lamps as described above, the front end of the aiming screw is not projected forward over the movable member by the adjustment of the optical axis. Such a device, therefore, can be easily applied not only to head lamps of the reflection mirror moving type but also to head lamps of the lamp unit moving type. Further, since the head serving as a fixing point of the aiming screw is formed into an approximately spherical shape and fitted into the hollow bearing, the movable member can be moved smoothly around the head of the aiming screw along with the adjustment of the optical axis. Accordingly, the adjusting operation of the optical axis can be done quickly and smoothly without any shaking of the aiming screws, and no deflection will occur after the adjustment of the optical axis.

Still further, since the screw portion of the aiming screw is screwed into the female threaded hole formed in the shaft center of the spur gear in the gear case, any self-locking nut as conventionally used is not required, whereby the costs of parts can be lowered.

Figure 6:
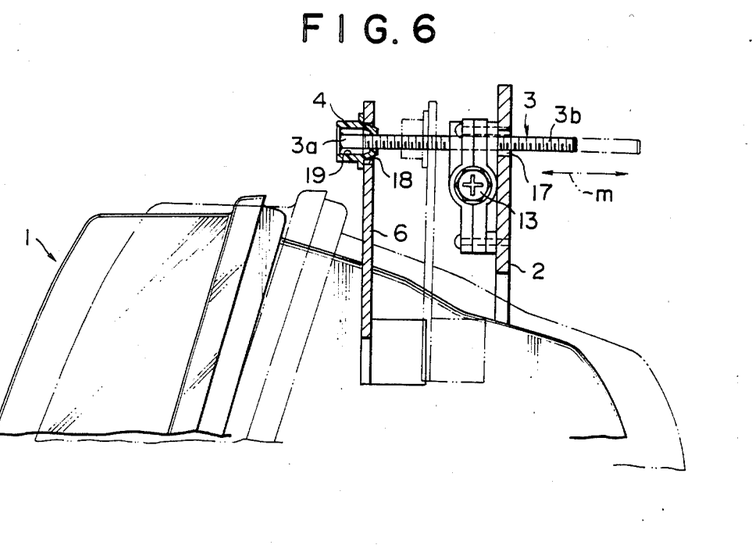
FIG. 6 is a front view, with a part broken away.
Figure 7:
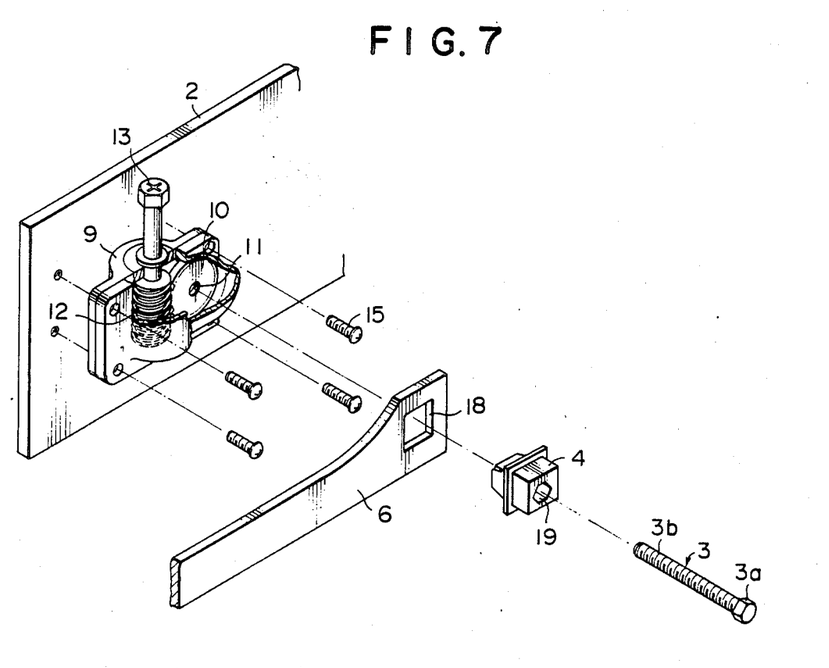
FIG. 7 is an exploded perspective view, with a part broken away.
Figure 8:
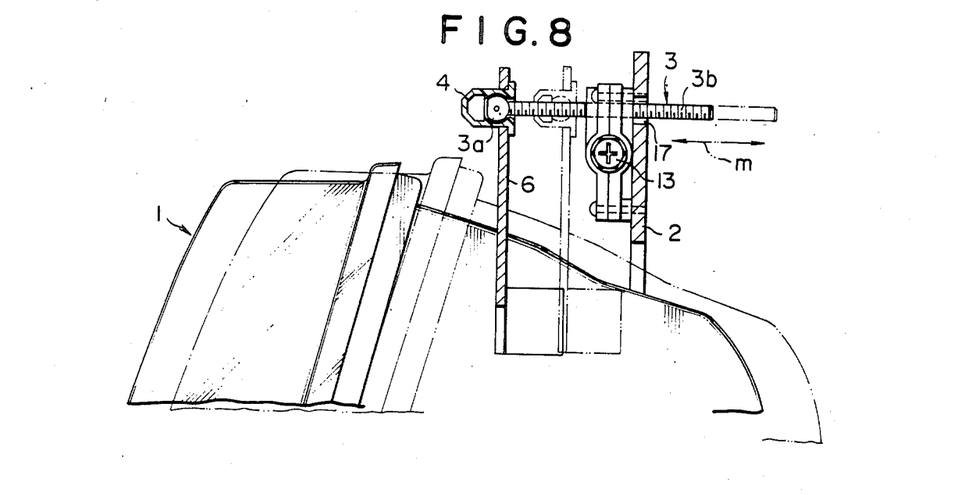
FIG. 8 is a front view, with a part broken away.
Figure 9:
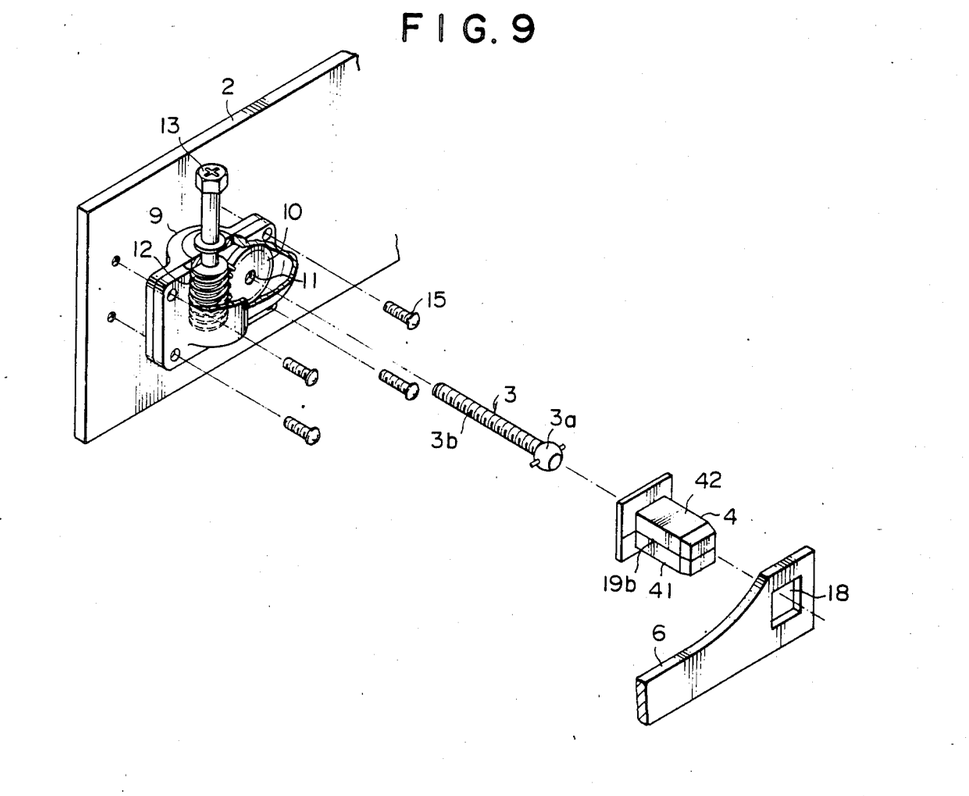
FIG. 9 is an exploded perspective view, with a part broken away.

Now, the second embodiment of the present invention as shown in FIGS. 6 and 7 will be described. Since this embodiment is different from the first embodiment only in the means for inhibiting the aiming screw 3 from rotating circumferentially, corresponding parts are designated by the same reference characters, and description of the same components is omitted to avoid repeats. In the second embodiment, a square-shaped fitting hole 18 is formed in an adjust metal 6 secured to the lamp unit, and a hollow bearing 4 having a square external shape is fitted into the fitting hole 18, so that the hollow bearing 4 is non-rotatably attached to the adjust metal. Said hollow bearing 4 is provided with a hexagonal engaging hole 19 for holding the head 3a of the aiming screw 3, and the hexagonally shaped head 3a of the aiming screw 3 is fitted into the hole 19 to be held by the same, such that the head 3a of the aiming screw 3 is non-rotatably connected to the hollow bearing such that the aiming screw 3 is inhibited from rotating circumferentially. According to this embodiment, not only the similar functions and effects to those of the above-mentioned first embodiment can be obtained, but also a very ordinary bolt with a hexagonal head can be used as an aiming screw so that the cost of parts can be lowered.

Figure 10:
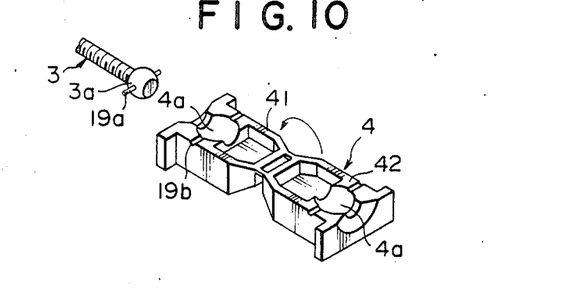
FIG. 10 is an exploded perspective view, with a hollow bearing developed.
Figure 11:
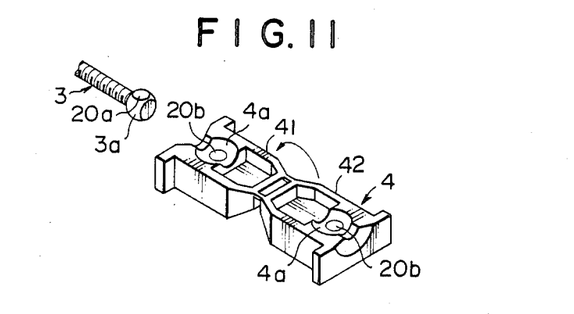
FIG. 11 is an exploded perspective view showing another embodiment of a hollow bearing, with the bearing developed.

In the third embodiment of the present invention as shown in FIGS. 8 to 11, a square-shaped fitting hole 11 is formed in an adjust metal secured to the lamp unit, and a square-shaped hollow bearing 4 is fitted into the fitting hole 18, so that the hollow bearing 4 is attached non-rotatably to the adjust metal 6. The head 3a of the aiming screw 3 is formed into an approximately spherical shape and held by the hollow bearing 4, while both of the head 3a of the aiming screw 3 and the hollow bearing 4 are internally provided with engaging portions to be engaged with each other, so that the aiming screw 3 is inhibited from rotating circumferentially. More specifically, in the embodiment as shown in FIG. 10, the head 3a of the aiming screw 3 is formed into an approximately spherical shape while being provided with a pin-shaped engaging portion 19a projected in the direction perpendicular to the axis of the screw portion 3b. On the other hand, the hollow bearing 4 is constructed with two members 41 and 42 having the same shape and divisible in the axial direction. A spherical receiving seat 4a for holding the head 3a of the aiming screw 3 is formed within these members 41 and 42, while they are also provided with an engaging portion 19b consisting of concave grooves for grasping the pin-shaped engaging portion 19a projected from the head 3a of the aiming screw 3, so that the head 3a of the aiming screw 3 is slidably held by the spherical face receiving seat 4a, and the pin-shaped engaging portion 19a projected from the head 3a is engaged by the engaging portion 19b consisting of the concave grooves so that the aiming screw 3 is non-rotatably connected to the hollow bearing 4. Incidentally, it is preferred in this embodiment to provide a gap between the pin-shaped engaging portion 19a projected from the head 3a of the aiming screw 3 and the engaging portion 19b consisting of the concave grooves of the hollow bearing 4, in view of possible deflective movement during the adjustment of the optical axis. In the embodiment as shown in FIG. 11, the head 3a of the aiming screw 3 is formed into an approximately spherical shape, while the head 3a is provided in its top and bottom with planar engaging portions 20a. On the other hand, a spherical face receiving seat 4a to be fitted to the head 3a of the aiming screw 3 is formed in the hollow bearing 4 consisting of two members 41 and 42 having the same shape and divisible in the axial direction, while the hollow bearing 4 is provided with hill-shaped engaging portions 20b having a flat top to be fitted to the planar engaging portions 20a, so that the head 3a of the aiming screw 3 is slidably held by the spherical face receiving seat 4a, while the planar engaging portions 20a are engaged by the hill-shaped engaging portions 20b of the hollow bearing 4 such that the aiming screw 3 is non-rotatably connected to the hollow bearing 4. In this embodiment, it will be apparent that the hollow bearing 4 may not necessarily be constructed with the two members 41 and 42, but may be provided internally with a spherical face receiving seat 4a and an engaging portion 20b so that the head 3a of the aiming screw 3 is pressed into there and fitted with each other. Thus, this third embodiment can provide similar functions and effects to those of the above-mentioned first embodiment.

Figure 12:
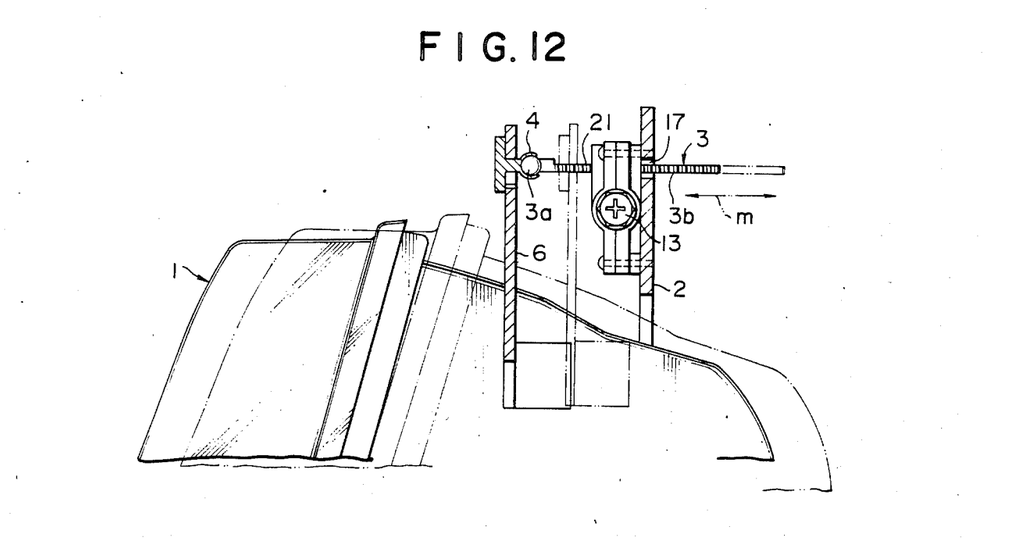
FIG. 12 is a front view with a part broken away.
Figure 13:
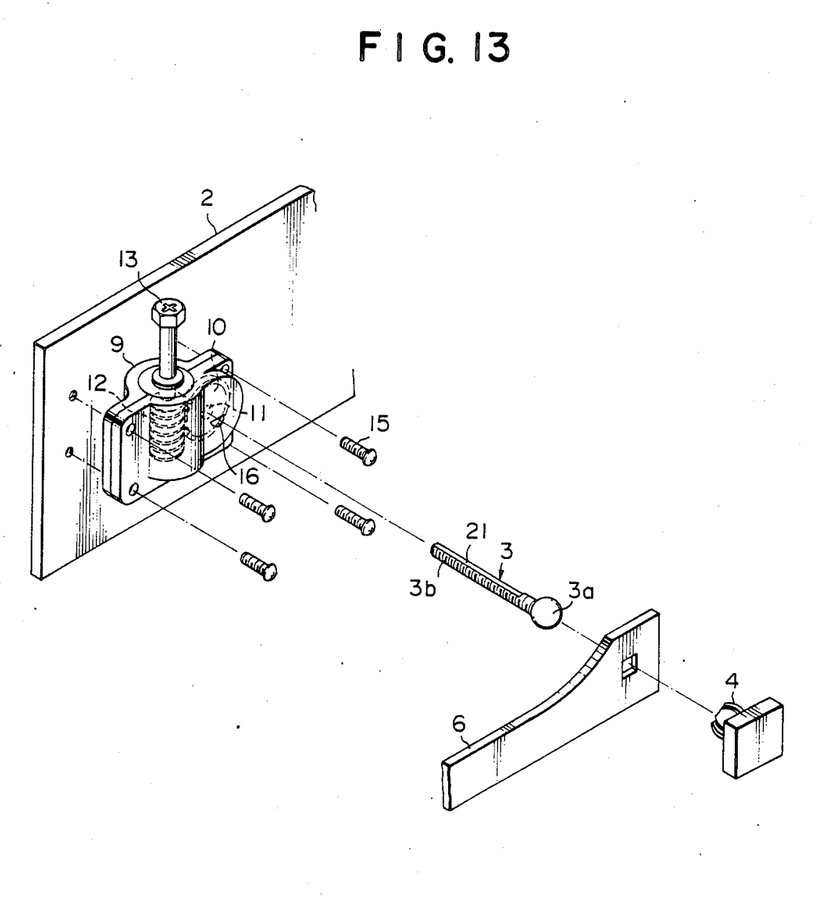
FIG. 13 is an exploded perspective view.

In the fourth embodiment of the present invention as shown in FIGS. 12 and 13, the head 3a of the aiming screw 3 is formed into a spherical shape to be fitted into the hollow bearing 4 attached to the movable member 1, while the screw portion 3b of the aiming screw 3 is provided with a planar portion 21 along its axis. On the other hand, the inserting hole 16 of the gear case 9 through which the screw portion 3b is to be passed is formed into an approximately D shape so as to be fitted to the profile of the screw portion 3b. In such a manner, when the screw portion 3b of the aiming screw 3 is screwed into the female threaded hole 11 of the spur gear 10 in the gear case 9, the aiming screw 3 is engaged by the inserting hole 16 such that it is inhibited from rotating circumferentially. According to this fourth embodiment, therefore, similar functions and effects to those of the aforementioned first embodiment can be obtained, and moreover the construction of the hollow bearing can be simplified.

Figures 14, 15:
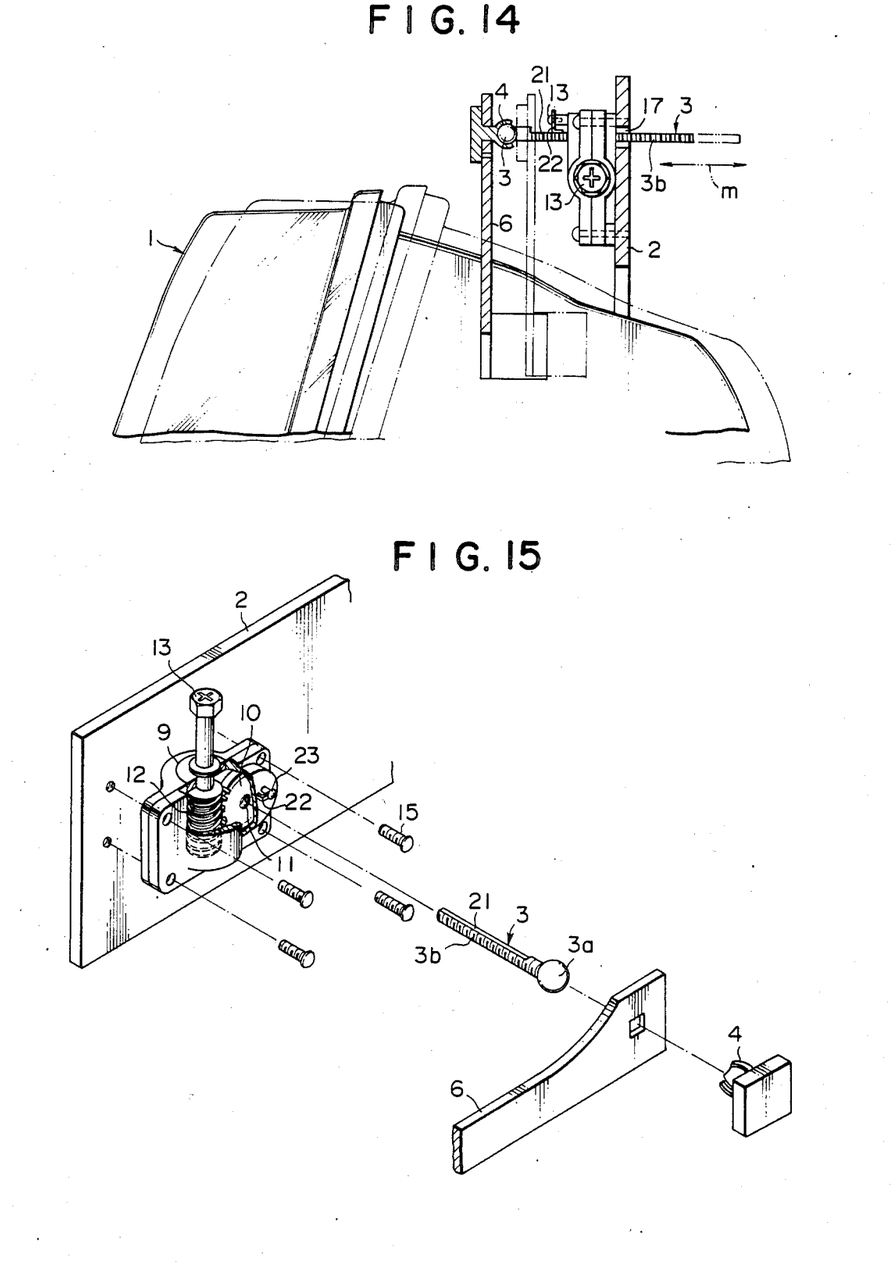
FIG. 14 is a front view with a part broken away.
FIG. 15 is an exploded perspective view with a part broken away.

Finally, in the fifth embodiment of the present invention as shown in FIGS. 14 and 15, the head 3a of the aiming screw 3 is formed into a spherical shape similarly to that of the fourth embodiment so as to be fitted into the hollow bearing 4 attached to the adjust metal 6 of the movable member 1, while the screw portion 3b of the aiming screw 3 is provided with a planar portion 21 along the axis thereof. On the other hand, a rotation stopping piece 22 is secured to the gear case 9 with a screw 23, and the rotation stopping piece 22 is applied against and engaged with the planar portion 21 formed on the screw portion 3b of the aiming screw 3, so that the aiming screw 3 is inhibited from rotating circumferentially. Thus, this fifth embodiment can also provide similar functions and effects to those of the aforementioned first embodiment.

Although the first to fifth embodiments have been described with respect to a head lamp of the lamp unit type in which the object to be moved for adjusting the optical axis is a lamp unit, it will be readily appreciated that the device according to the present invention also can be applied to a head lamp of the reflection mirror type in which the object to be moved for adjusting the optical axis is a reflection mirror.

We claim:

1. An aiming device for a movable member of an automobile, comprising:
    a hollow bearing attached to said movable member for adjusting an optical axis thereof,
    a gear case attached to a fixed member and having therein a worm gear and spur gear in meshing engagement with each other,
    an aiming screw having a head fitted into said hollow bearing and a screw portion screwed into a female threaded hole formed in the shaft center of said spur gear, and
    means for inhibiting said aiming screw from rotating circumferentially with respect to said gear case, said means for inhibiting including a stop element on said head of said aiming screw and a complementary engagement element associated with said hollow bearing, which operatively engages said stop element to inhibit rotation of said aiming screw.

2. An aiming device as claimed in claim 1, wherein the movable member is one of a lamp unit and a reflection mirror.

3. An aiming device as claimed in claim 1, wherein the fixed member is one of an autobody and a housing of a lamp unit.

4. An aiming device as claimed in claim 1, wherein the hollow bearing is attached one of (a) to a support member integrally formed with the movable member and (b) directly to the movable member.

5. An aiming device as claimed in claim 1, wherein said head has a spherical configuration, the hollow bearing is non-rotatably attached to the movable member and includes a spherical face receiving seat, said engagement element includes an engaging hole formed in an innermost portion of a spherical face receiving seat of the hollow bearing, and said stop element includes an engaging portion projected from the top of the spherical head of the aiming screw and inserted into and engaged with said engaging hole.

6. An aiming device as claimed in claim 5, wherein the external shape of the hollow bearing is formed into a frustum of a cone with an engaged projection projected from the external surface thereof, and a fitting hole having a shape of a frustum of a cone to be fitted to the external shape of the hollow bearing is formed in a support member formed with the movable member for supporting the hollow bearing fitted into the same, the fitting hole being provided with an engaging groove to be engaged with said engaging projection so that the hollow bearing is non-rotatably fitted into the support member on the movable member.

7. An aiming device as claimed in claim 5, wherein the external shape of the hollow bearing is formed into a frustum of a pyramid, and a support member formed with the movable member for supporting the hollow bearing fitted to the same is provided with a fitting hole formed into a frustum of a pyramid to be fitted to the external shape of the hollow bearing, so that the hollow bearing is non-rotatably fitted into the support member of the movable member.

8. An aiming device as claimed in claim 1, wherein the hollow bearing is non-rotatably attached to the movable member, said stop element is formed by a hexagonally shaped head of the aiming screw, and said engagement element includes an engaging hole formed into a hexagonal shape in the hollow bearing for holding the head of the aiming screw.

9. An aiming screw as claimed in claim 1, wherein said head has a spherical configuration, the hollow bearing is non-rotatably attached to the movable member and is comprised of two members having the same shape and divisible in the axial direction, said stop element includes a pin-shaped engaging portion projected from the spherical head of the aiming screw in a direction perpendicular to the screw portion, and said engagment element includes an engaging portion formed into a concave recess in said hollow bearing for supporting the pin-shaped engaging portion of the head of the aiming screw in a grasping relation.

10. An aiming device as claimed in claim 1, wherein said head has a spherical configuration, the hollow bearing is non-rotatably attached to the movable member, said stop element includes planar engaging portions formed in the spherical head of the aiming screw, and said engagement element includes hill-shaped engaging portions having a flat top formed in a spherical face receiving seat in said hollow bearing for engagement with the planar engaging portions in the head of the aiming screw.

* * * * *